(12) United States Patent
Jackson

(10) Patent No.: US 11,390,158 B1
(45) Date of Patent: Jul. 19, 2022

(54) GAS DIFFERENTIATING INSERT

(71) Applicant: Samuel E. Jackson, Del Valle, TX (US)

(72) Inventor: Samuel E. Jackson, Del Valle, TX (US)

( * ) Notice: Subject to any disclaimer, the term of this patent is extended or adjusted under 35 U.S.C. 154(b) by 29 days.

(21) Appl. No.: 15/906,695

(22) Filed: Feb. 27, 2018

Related U.S. Application Data

(60) Provisional application No. 62/510,565, filed on May 24, 2017.

(51) Int. Cl.
*B60K 15/04* (2006.01)
*B60K 15/03* (2006.01)

(52) U.S. Cl.
CPC ...... *B60K 15/04* (2013.01); *B60K 2015/0321* (2013.01); *B60K 2015/0483* (2013.01)

(58) Field of Classification Search
CPC .... B60K 2015/0321; B60K 2015/0483; B60K 15/04
USPC ......................................................... 141/392
See application file for complete search history.

(56) References Cited

U.S. PATENT DOCUMENTS

| | | | | |
|---|---|---|---|---|
| 214,545 A * | 4/1879 | Bacon | ...................... | E01F 5/005 285/399 |
| 2,717,614 A * | 9/1955 | Palivos | .................... | E03C 1/084 138/37 |
| 2,744,738 A * | 5/1956 | Hjulian | .................... | E03C 1/084 210/198.1 |
| 2,754,097 A * | 7/1956 | Hjulian | .................... | E03C 1/084 239/428 |
| 2,888,209 A * | 5/1959 | Hjulian | .................... | E03C 1/084 261/76 |
| 2,928,607 A * | 3/1960 | Shames | .................... | E03C 1/084 239/107 |
| 3,880,317 A * | 4/1975 | Arnett | ..................... | B60K 15/04 220/86.2 |
| 4,326,641 A * | 4/1982 | Wilken | .............. | B60K 15/0403 141/392 |
| 4,630,748 A * | 12/1986 | Keller | ................ | B60K 15/0403 220/86.3 |
| 5,495,872 A * | 3/1996 | Gallagher | ............... | F15D 1/025 138/40 |
| 6,183,167 B1 * | 2/2001 | Ruiz | ....................... | E02D 5/285 403/379.3 |
| 6,923,226 B2 * | 8/2005 | Bartlett | .................. | B60K 15/04 141/286 |

(Continued)

FOREIGN PATENT DOCUMENTS

| | | | | |
|---|---|---|---|---|
| EP | 1264726 A2 * | 12/2002 | ............. | B60K 15/04 |
| KR | 20050119796 A * | 12/2005 | | |
| WO | WO-2017007129 A1 * | 1/2017 | ............. | B60K 15/04 |

*Primary Examiner* — Timothy L Maust
*Assistant Examiner* — J. Hakomaki
(74) *Attorney, Agent, or Firm* — Cramer Patent & Design, PLLC; Aaron R. Cramer

(57) ABSTRACT

A gas differentiating nozzle device includes a tubular housing made of a fuel resistant material having a perpendicularly positioned dowel passing through a near center portion of the device. A first half of the device above the dowel further comprises a plurality of concentric interior tubes in fluid communication with a second half of the device below the dowel which further comprises a plurality of rectangular vents disposed near the second half end of the device.

1 Claim, 6 Drawing Sheets

(56) References Cited

U.S. PATENT DOCUMENTS

| | | | |
|---|---|---|---|
| 6,966,349 B1* | 11/2005 | Laduke | B60K 15/04 |
| | | | 141/367 |
| 7,040,360 B2* | 5/2006 | Watson | B60K 15/0403 |
| | | | 141/255 |
| 7,090,153 B2* | 8/2006 | King | B05B 1/20 |
| | | | 239/553 |
| 8,459,483 B2* | 6/2013 | Bisaillon | B60K 15/0403 |
| | | | 220/86.3 |
| 9,272,618 B2* | 3/2016 | Breuer | B60K 15/04 |
| 9,415,995 B2 | 8/2016 | Roys | |
| 9,447,908 B2* | 9/2016 | Watson | F16L 55/00 |
| 9,469,520 B2* | 10/2016 | Schulze | B67D 7/42 |
| 10,258,939 B2* | 4/2019 | Gupta | B65D 23/04 |
| 2005/0000592 A1* | 1/2005 | Bartlett | B60K 15/04 |
| | | | 141/367 |
| 2006/0096662 A1 | 5/2006 | King et al. | |
| 2009/0145516 A1* | 6/2009 | Wells | B60K 13/04 |
| | | | 141/367 |
| 2009/0321441 A1 | 12/2009 | Horlacher et al. | |
| 2011/0315682 A1 | 12/2011 | Tsiberidis | |
| 2013/0074987 A1 | 3/2013 | Breuer et al. | |
| 2013/0168392 A1 | 7/2013 | Kuyama et al. | |
| 2014/0110405 A1 | 4/2014 | Breuer et al. | |
| 2014/0367390 A1* | 12/2014 | Horlacher | B60K 15/03006 |
| | | | 220/562 |
| 2015/0069058 A1 | 3/2015 | Ryu et al. | |

* cited by examiner

GAS DIFFERENTIATING INSERT

RELATED APPLICATIONS

The present invention was first described in and claims the benefit of U.S. Provisional Application No. 62/510,565 filed May 24, 2017, the entire disclosures of which are incorporated herein by reference.

FIELD OF THE INVENTION

The present invention relates generally to the field of fuel nozzle restrictors and more specifically relates to diesel fuel nozzle restrictors which prevent an unleaded gas nozzle from being used to fill a diesel fuel tank of a motor-vehicle.

BACKGROUND OF THE INVENTION

Currently, there is not a cost-effective way of preventing a diesel fuel tank from being filled with unleaded gas in a motor-vehicle. The consequences of running unleaded gas in a diesel engine may be catastrophic. The engine may, at the very least need some repair, and at the worst, replacement. A common unleaded fueling nozzle is smaller in diameter than that of a diesel nozzle. Accordingly, there is a clearly felt need in the art for a diesel fuel nozzle restrictor which prevents a diesel tank from being filled with unleaded gasoline. A suitable solution is desired.

Various attempts have been made to solve problems found in fuel nozzle restrictor art. Among these are found in: U.S. Pat. No. 6,302,169 to Pulos; U.S. Pat. No. 7,302,977 to King et. al.; and U.S. Pat. No. 7,182,111 to McClung et. al. These prior art references are representative of diesel fuel nozzle restrictors which prevent an unleaded gas nozzle from being used to fill a diesel fuel tank.

None of the above inventions and patents, taken either singly or in combination, is seen to describe the invention as claimed. Thus, a need exists for a reliable gas nozzle differentiator system, and to avoid the above-mentioned problems.

SUMMARY OF THE INVENTION

The principles of the present invention provide for such a fuel tank insert system to encompass a carrier having a carrier first end, a carrier second end, and an aligned pair of first apertures, an insert having an insert first end, an insert second end, an aligned pair of second apertures, and a pin capable of inserting within aligned pair of first apertures and aligned pair of second apertures to secure the insert within the carrier. The insert has a diameter capable of not permitting the insertion of a standard gasoline pump nozzle within the system. A clearance between an inner diameter of the carrier and an outer diameter of the insert permits the insertion of a diesel fuel pump nozzle therein.

It is an object of the present invention to provide such a carrier first end to have a circumscribing rim.

It is another object of the present invention to provide such an insert to have an aerating feature located at the insert second end.

It is another object of the present invention to provide such an insert to have a sensor slot extending inward from the insert second end.

It is yet another object of the present invention to provide such an insert to have at least one (1) ventilation slot, each extending inward from the insert second end.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
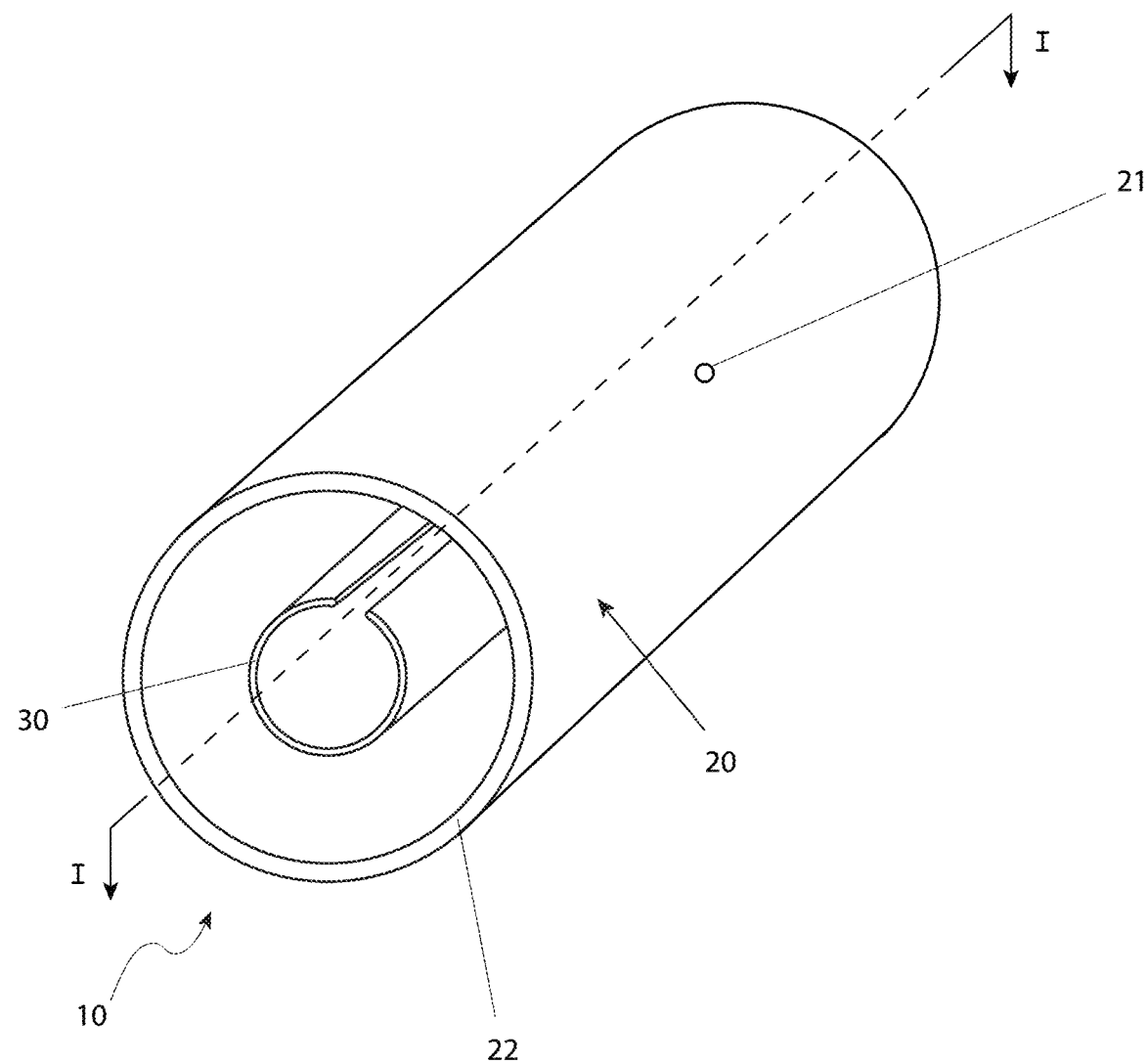
FIG. 1 is a perspective view of a gas nozzle differentiator system 10, according to an embodiment of the present invention.

DESCRIPTIVE KEY 10 gas differentiating nozzle
20 carrier
21 first aperture
22 rimmed edge
30 insert
31 second aperture
32 aerating feature
33 sensor slot
34 ventilation slot
50 dowel pin
55 motor vehicle
60 fuel fill neck
65 diesel fill tube
70 diesel fuel fill pump
75 gasoline fill tube

DETAILED DESCRIPTION OF THE PREFERRED EMBODIMENT

The present invention is directed to a gas nozzle differentiator system. In one (1) embodiment, the gas nozzle differentiator system (herein described as the "system") 10 is then capable of inserted into a diesel fuel tank fill neck of a motor vehicle. The system 10 comprises a diameter equally matching a diameter of a standard gasoline pump nozzle, thereby not permitting the standard gasoline pump nozzle to be inserted into a diesel tank fitted with the system 10 and eliminate the possibility of accidentally filling a diesel fuel tank with standard gasoline. A diesel fuel pump nozzle has a larger diameter than a standard gasoline pump nozzle. The system 10 permits the diesel fuel pump nozzle to be inserted such that components of the system 10 can pass through the interior of the diesel fuel pump nozzle when the diesel fuel pump nozzle in inserted into the system 10. It is appreciated that a separate embodiment exists where the diesel fuel tank is fabricated with the system 10 as an integral part thereof, being implemented as a total filler tube replacement in new or existing vehicles.

Referring now to FIG. 1, a perspective view of a gas nozzle differentiator system 10, according to an embodiment of the present invention is depicted. A carrier 20 encompasses an insert 30 in a linear and symmetrical manner. The carrier 20 is provided with a rimmed edge 22 about a circumferential edge of a first end thereof. The rimmed edge 22 has a diameter slightly larger than that of the opening of a diesel fuel tank to stop the carrier 20 from being fully inserted and lost within the diesel fuel tank. Located at diametrically-opposed locations along the outer wall of the carrier 20 are two (2) first aperture 21 (of which only one (1) is shown due to illustrative limitations). The first aperture 21 can be located preferably at a midpoint or closer to the second end of the carrier 20.

Figure 2:
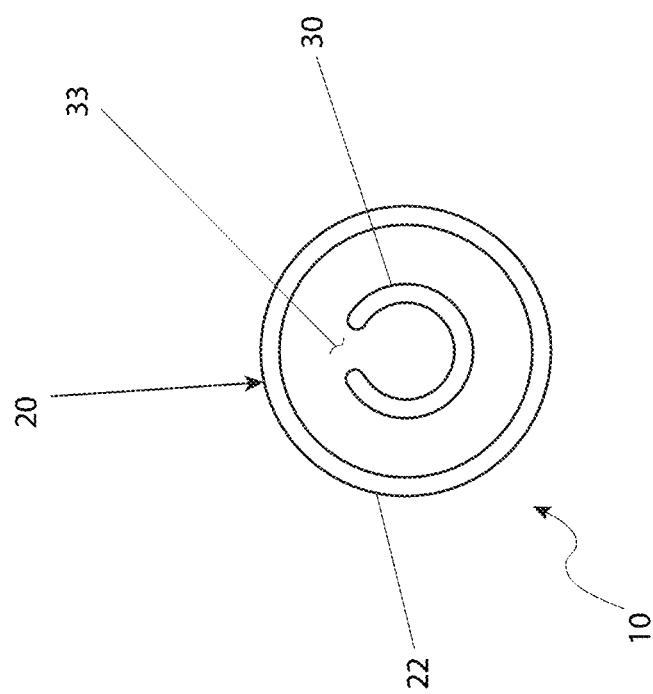
FIG. 2 is a front view of a gas nozzle differentiator system 10, according to an embodiment of the present invention.

Referring next to FIG. 2, a front view of a gas nozzle differentiator system 10, according to an embodiment of the present invention is disclosed. This view provides further information of the carrier 20 with the forward facing rimmed edge 22 along with the insert 30, centrally located. A sensor slot 33 is provided at the uppermost surface of the insert 30 to allow for various sensors provided on the diesel fuel dispensing nozzle to function in a normal manner.

Figure 3:
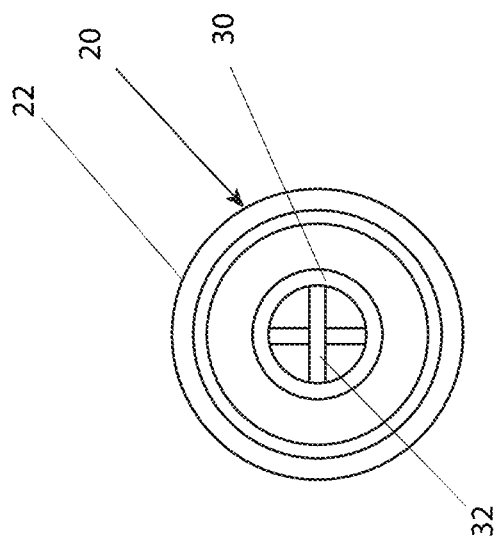
FIG. 3 is rear view of a gas nozzle differentiator system 10, according to an embodiment of the present invention.

Referring now to FIG. 3, a rear view of a gas nozzle differentiator system 10, according to an embodiment of the present invention is shown. This view provides further information on the rimmed edge 22 disposed at the opposite end of the carrier 20 along with the insert 30, centrally located. An aerating feature 32 is located at this end of the insert 30 to 20 aid in diesel fuel transfer during filling. The aerating feature 32 may include a plus-shaped aerating feature 32A located at said insert second end.

Figure 4:
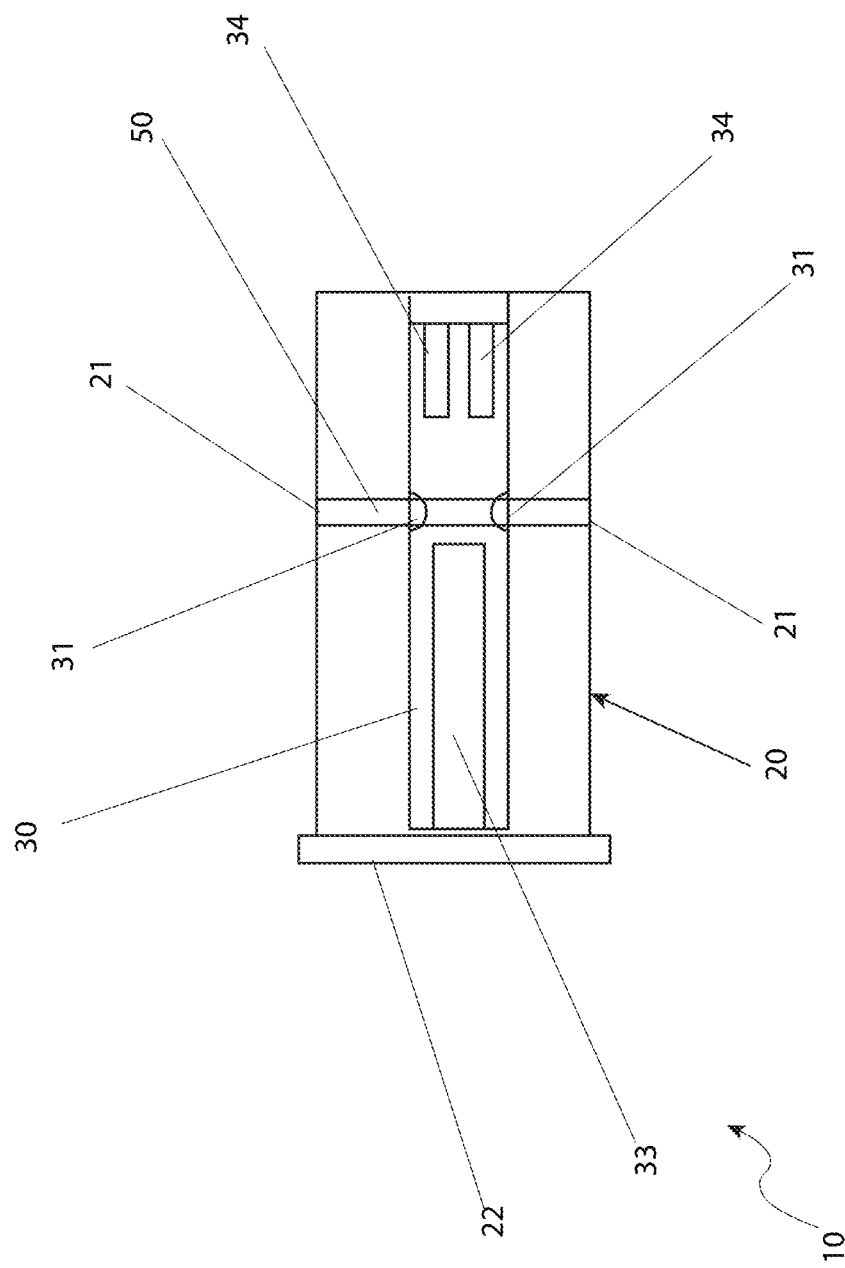
FIG. 4 is a sectional view of a gas nozzle differentiator system 10, as seen along a line I-I, as shown in FIG. 1, according to an embodiment of the present invention.

Referring next to FIG. 4, a sectional view of a gas nozzle differentiator system 10, as seen along a line I-I, as shown in FIG. 1, according to an embodiment of the present invention is depicted. The insert 30 is axially and symmetrically located within the carrier 20 with the rimmed edge 22 located at a left-hand side when viewed at the orientation of FIG. 4. The insert 30 is physically fastened within the carrier 20 with the use of a dowel pin 50 that passes through the two (2) first apertures 21 in the carrier 20, as well as two (2) second apertures 31 within the insert 30. A set of four (4) ventilation slots 34 (only two (2) of which are shown due to illustrative limitations) are located in the right-hand end of the insert 30 when viewed at the orientation of FIG. 4. This ventilation slot 34 aids in the flow of diesel fuel through the insert 30. The clearance between the outer diameter of the insert 30 and the inner diameter of the carrier 20 is such to allow the insertion of a diesel fuel pump nozzle to be inserted between such diameter differential, however, the outer diameter of the insert 30 would prohibit the acceptance of a standard gasoline pump nozzle.

Figure 5:
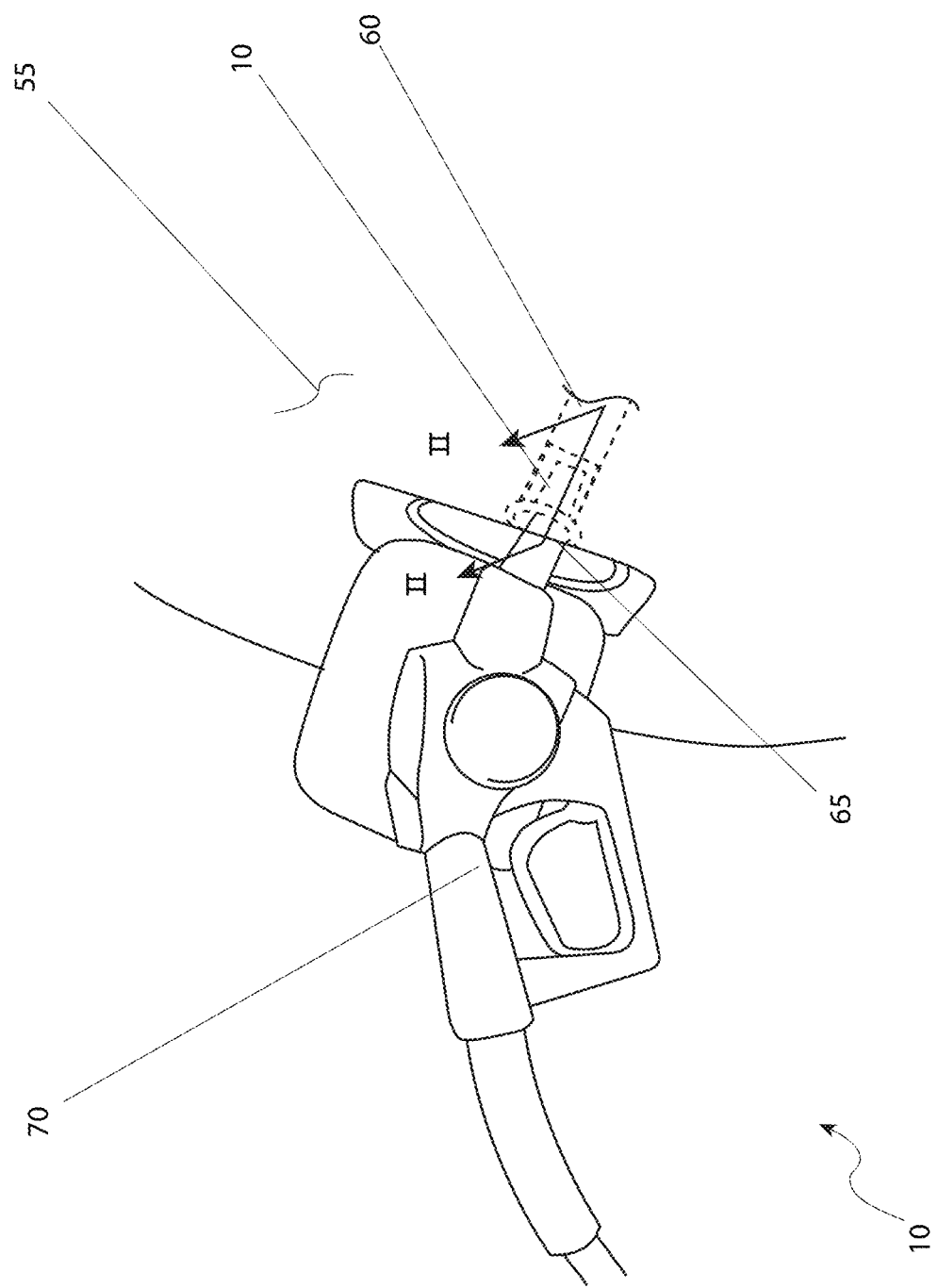
FIG. 5 is a perspective view of a gas nozzle differentiator system 10, shown in a utilized state on a motor vehicle 55, according to an embodiment of the present invention.

Referring now to FIG. 5, a perspective view of a gas nozzle differentiator system 10, shown in a utilized state on a motor vehicle 55, according to an embodiment of the present invention is disclosed. While the motor vehicle 55 is depicted as a standard automobile, it is noted that the system 10 can be used on any fuel tank used on any motor vehicle or engine that utilizes diesel fuel. As such, the use of the system 10 upon trucks, vans, boats, farm equipment, engine generator sets, or the like can be utilized with the present invention. As such, the use of the system 10 with any specific type of device should not be interpreted as a limiting factor of the present invention. The system 10 is positioned at the upper proximal end of a fuel fill neck 60 such that a diesel fill tube 65 of a diesel fuel fill pump 70 may enter and fuel (fill) the diesel fuel tank associated with the motor vehicle 55.

Figure 6:
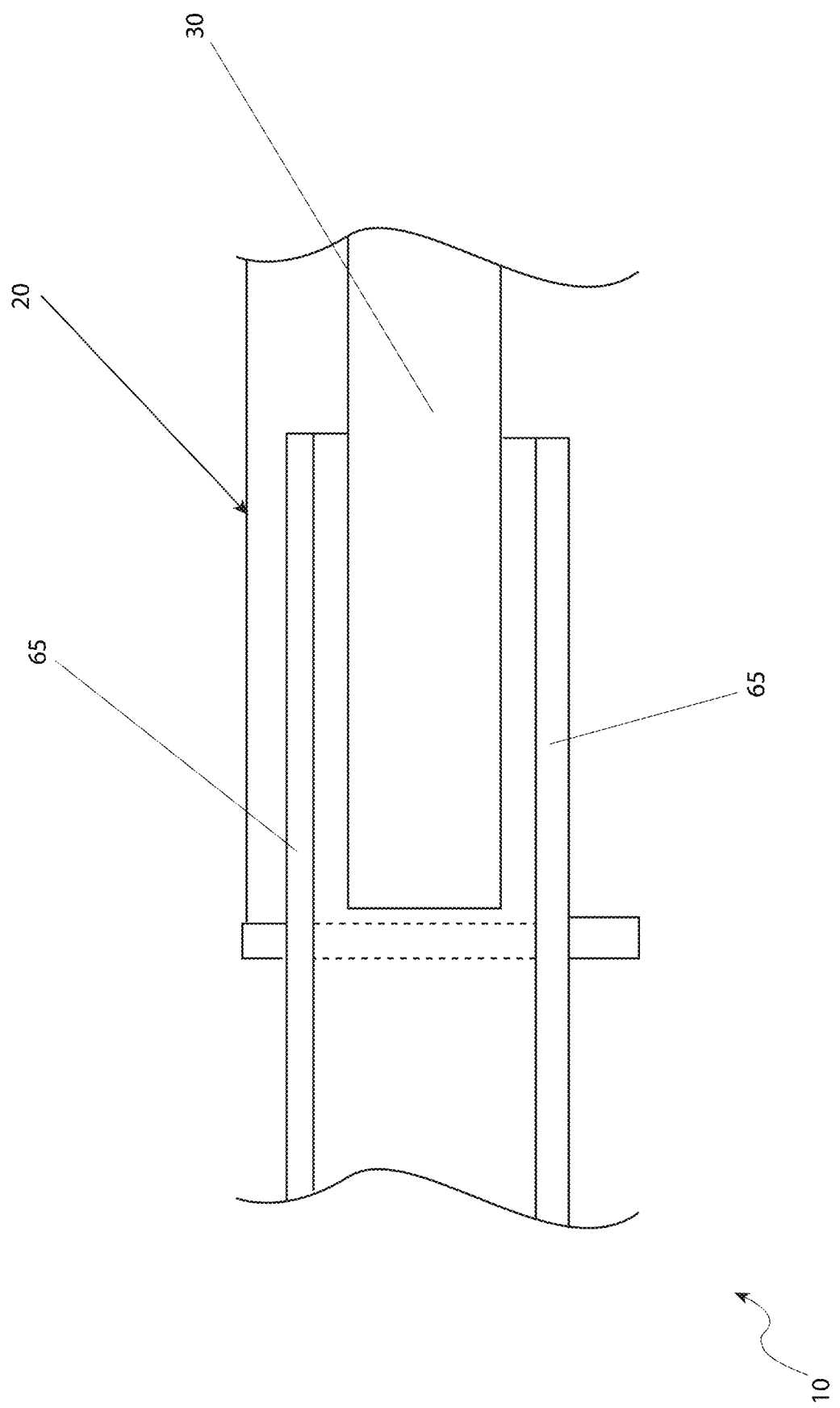
FIG. 6 is a sectional view of the system, shown in a utilized state with a diesel fill tube 65, as seen along a line II-II, as shown in FIG. 5, according to an embodiment of the present invention; and, FIG. 7 is a sectional view of the system, shown in an attempted utilized state with a gasoline fill tube 75, as seem along a line II-II, as shown in FIG. 5, according to an embodiment of the present invention.

Referring next to FIG. 6, a sectional view of the system, shown in a utilized state with a diesel fill tube 65, as seen along a line II-II, as shown in FIG. 5, according to an embodiment of the present invention is shown. As such, FIG. 6 depicts proper operation of a system 10 in that said system 10 allows a diesel fill tube 65 to couple with the system 10 and fill a diesel fuel tank. The outer diameter of the diesel fill tube 65 is lesser than the inner diameter of the carrier 20, while the inner diameter of the diesel fill tube 65 is greater than the outer diameter of the insert 30. As such, diesel fuel can flow in a normal and customary manner.

Figure 7:
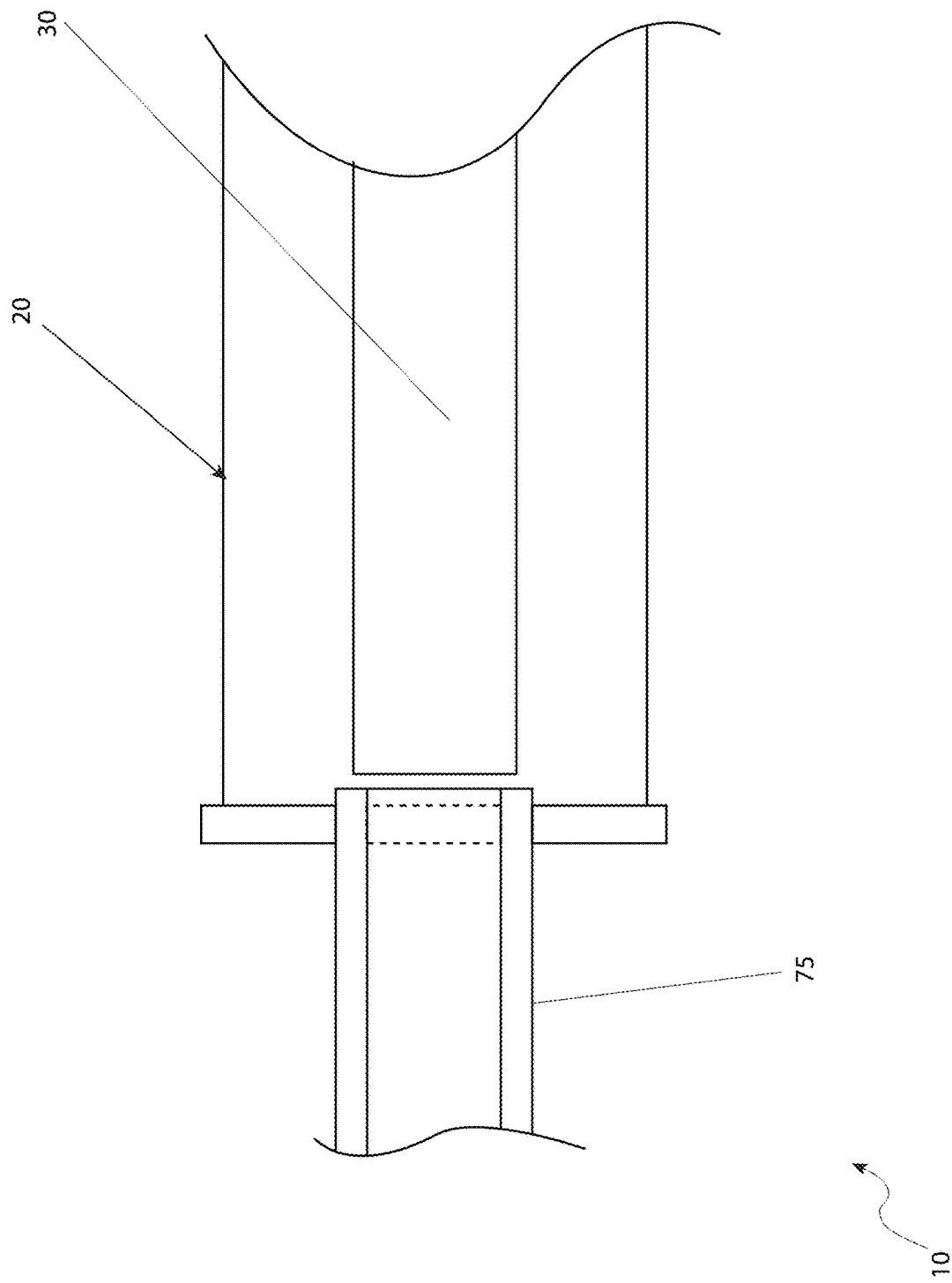

Referring finally to FIG. 7, a sectional view of the system, shown in an attempted utilized state with a gasoline fill tube 75, as seem along a line II-II, as shown in FIG. 5, according to an embodiment of the present invention is depicted. As such, FIG. 7 depicts the alternate proper operation of the system 10 in that it prohibits the entry of a gasoline fill tube 75 and thus prohibits filling a diesel fuel tank with gasoline. While the outer diameter of the gasoline fill tube 75 is lesser than the inner diameter of the carrier 20, the inner diameter of the gasoline fill tube 75 is also lesser than the outer diameter of the insert 30. As such, the gasoline fill tube 75 cannot gain entry and gasoline cannot flow.

The exact specifications, materials used, and method of use of the system 10 may vary upon manufacturing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A gas nozzle differentiator system, consisting of:
   a carrier having a carrier first end, a carrier second end, and an aligned pair of first apertures;
   an insert having an insert first end, an insert second end, an aligned pair of second apertures; and
   a dowel pin inserted within said aligned pair of first apertures and said aligned pair of second apertures to secure said insert within said carrier;
   wherein a clearance between an inner diameter of said carrier and an outer diameter of said insert permits insertion of a diesel fuel pump nozzle therein, said outer diameter of the insert would prohibit the acceptance of a standard gasoline pump nozzle;
   wherein said insert includes a plus-shaped aerating feature located at said insert second end;
   wherein said insert includes a set of four ventilation slots;
   wherein said insert includes a sensor slot;
   wherein said carrier first end includes a circumscribing rim; and
   wherein said carrier encompasses said insert in a linear and symmetrical manner.

* * * * *